United States Patent Office 2,857,322
Patented Oct. 21, 1958

2,857,322

PHOTOPOLYMERIZATION OF ACRYLONITRILE

Edwin W. Lard, Decatur, Ala., assignor to The Chemstrand Corporation, Decatur, Ala., a corporation of Delaware No Drawing. Application April 28, 1954
Serial No. 426,275

7 Claims. (Cl. 204—158)

This invention relates to a new method of preparing uniform polymers of acrylonitrile or copolymers of acrylonitrile and other polymerizable monomers, and more particularly it relates to a new method of preparing such polymers by photopolymerization.

It is well known that poylacrylonitrile and copolymers of high proportions of acrylonitrile and minor proportions of other polymerizable monomers are valuable fiber forming compositions. Fibers prepared from such polymers have excellent physical and chemical properties and consequently have met with considerable commercial success. These compositions are not without disadvantages, however, and one of the most serious has been the color of the fibers. It is well known that acrylonitrile and polymers thereof tend to discolor upon prolonged heating and the objectionable color referred to can be traced in large measure to heating required for complete and rapid polymerization. The art has therefore long sought a practicable method whereby acrylonitrile polymers could be prepared at relatively low temperatures and thus avoid the discoloration due to heating. Photopolymerization of certain ethylenically unsaturated compounds has long been known and has met with fair success in some instances. When applied to acrylonitrile, the rate of polymerization has been such that photopolymerization has not been a feasible method for polymerization on a commercial scale largely because of the slowness of the process. Photopolymerization initiators have been proposed to alleviate this difficulty, and to a degree have been successful. These initiators have all been subject to the disadvantage of promoting polymerization to a degree greater than is necessary or desirable, so that the resulting polymers were of such high molecular weight that solutions thereof were difficult to prepare and such solutions were too viscous to be used in spinning operations.

The primary purpose of this invention is to provide a method for preparing colorless or very light colored acrylonitrile polymers. A further object of the invention is to provide a method for preparing acrylonitrile polymers of such molecular weights that solutions thereof can readily be fabricated into fibers by conventional spinning techniques. A still further purpose of this invention is the provision of an improved method for photopolymerization of acrylonitrile or mixtures of acrylonitrile with other monomers to produce polymers which are practically colorless and which can be readily fabricated into fibers of improved strength. Other objects and purposes of the invention will become apparent from the description thereof hereinafter.

It has now been found that many of the objectionable aspects of polyacrylonitrile and copolymers of acrylonitrile can be eliminated by conducting a photopolymerization in the presence of acetaldehyde as a polymerization initiator, accelerator, or catalyst. The photopolymerization may be according to any of the modes known to the art, e. g. bulk, solution, emulsion or suspension types of polymerization, with the bulk type being preferred to produce polymers practically completely free of color.

In practicing the bulk photopolymerization in accordance with this invention, from about 5 to 15% by weight of acetaldehyde is dissolved in the acrylonitrile, or mixture of acrylonitrile and another monomer, and the solution placed in a suitable vessel. The vessel can be of any suitable construction which will permit entry of sufficient light, and preferably should be constructed of glass so that light can enter the system through the sides of the vessel. In addition, or as an alternative, there can be a source of light within the vessel. The light may be derived from sunlight, a tungsten bulb, a mercury vapor lamp, or any other source which gives light either in the range of the ultraviolet rays plus visible light, or in the range of visible light alone. Polymerization occurs fairly rapidly under relatively mild conditions of temperature and the rate is dependent on both temperature in the system and the intensity of the light.

In emulsion polymerization the monomers and acetaldehyde are held in emulsion in water by suitable emulsifying agents kown to the art. The emulsion is then irradiated through the side of the vessel or by some other suitable method until polymerization has proceeded to the desirable extent.

In suspension polymerization the monomers to be polymerized containing acetaldehyde are rapidly agitated in an aqueous system containing a protective colloid, which acts as a suspending agent, in a suitable vessel.

In the solution method of polymerization, the acrylonitrile, and other monomers if desired, are dissolved in a solvent and light is directed upon the solution until the desired extent of polymerization is achieved.

Further details of the new polymerization method are set forth with respect to the following specific examples.

*Example I*

A 200 ml. Pyrex flask was charged with a solution consisting of 16 grams of acetaldehyde dissolved in 160 grams of acrylonitrile. The flask was placed in sunlight and polymerization started almost immediately as evidenced by change in viscosity, change in refractive index, and the formation of solid particles. After two hours the acrylonitrile was almost completely polymerized. The polyacrylonitrile was recovered from remaining monomer by filtration and an 18 percent solution thereof prepared in N,N-dimethylacetamide. Fibers were prepared from the solution by extrusion into an aqueous coagulating bath. The fibers so prepared possessed excellent physical properties and were practically colorless.

*Example II*

The procedure of Example I was repeated except that the flask was placed under an ultra violet lamp and the polymerization was observed to proceed more rapidly. A solution of the polymer so prepared in N,N-dimethylacetamide produced fibers of excellent physical properties and good color.

*Example III*

The procedure of Example I was repeated except that a mixture of 160 grams of acrylonitrile and 8 grams of vinylacetate was used in place of acrylonitrile alone. Practically identical results were obtained as in Example I.

*Example IV*

A 200 ml. Pyrex flask was charged with 80 grams of acrylonitrile and placed in sunlight. Polymerization proceeded very slowly and after 24 hours the polyacrylonitrile produced was recovered. It was possible to dissolve only about two percent by weight of this polymer in N,N-dimethylacetamide, and the resulting solution was a stiff gel which could not be used for fiber preparation.

Although some acceleration in polymerization is achieved at lower concentrations, in general at least 5 percent by weight of acetaldehyde, based on the weight of monomers, is required for effective photopolymerization to produce polymers of good color and desirable molecular weights in reasonable lengths of time. As much as 20 percent acetaldehyde can be used without appreciable quantities of acetaldehyde being found in the polymers.

The present invention is useful for the preparation of fiber forming polyacrylonitrile resins and the copolymers of at least 80 percent acrylonitrile and up to 20 percent of another nonbasic polymerizable monomer. Suitable comonomers for the practice of this invention are vinyl acetate and other vinyl esters of monocarboxylic acids having up to five carbon atoms, vinyl chloroacetate and other vinyl esters of α-chlorocarboxylic acids having up to five carbon atoms, methyl methacrylate and other alkyl esters of methacrylic acid wherein the alkyl radical has up to five carbon atoms, methyl acrylate and other alkyl esters of acrylic acid wherein the alkyl group has up to five carbon atoms, styrene and other vinyl substituted aromatic hydrocarbons, α-methyl styrene and other isopropenyl substituted aromatic hydrocarbons, methacrylonitrile and vinylidine chloride.

The light which is effective in causing the photopolymerization in accordance with this invention includes wave lengths both in the infrared and in the ultraviolet as well as all light in the intermediate visible spectrum. Light waves in the infrared are operable in effecting photopolymerization of acrylonitrile in the presence of acetaldehyde but the rate of photopolymerization is slower than in visible or in ultraviolet light. Light in the ultraviolet region having wavelengths shorter than 390 m$\mu$ and, for example, down to 180 m$\mu$, is operable in this process. The most useful and effective light is that having wavelengths between 280 m$\mu$ and 700 m$\mu$.

In practicing the process of this invention it is advantageous to use such a system that a controlled amount of light comes into contact with the material to be polymerized. The rate of polymerization varies directly with the intensity of the light and can usually be increased or decreased by increasing or decreasing the intensity of light that reaches the reaction mixture. The light can conveniently be supplied by a mercury vapor arc or tungsten bulb. Sunlight is another source of effective light for carrying out the photopolymerization in the presence of acetaldehyde. Diffused daylight contains wavelengths of light which are active for the catalyzed photopolymerization but the reaction is considerably slower than with other more intense sources of light.

The above description and examples are intended to be illustrative only. Any modification of or variation therefrom which conforms to the spirit of the invention is intended to be included within the scope of the claims.

I claim:

1. The process for preparing polymers of acrylonitrile which comprises, dissolving from five to 20 percent acetaldehyde based on the weight of monomer, in the acrylonitrile and exposing the resulting solution to actinic light.

2. The process for polymerizing acrylonitrile which comprises, dissolving in said acrylontrile from five to 20 percent of acetaldehyde, based on the weight of acrylonitrile, and exposing the resulting solution to actinic light.

3. The process for polymerizing acrylonitrile which comprises, dissolving in said acrylonitrile from five to 20 percent of acetaldehyde, based on the weight of acrylonitrile, and exposing the resulting solution to light of wavelengths in the range of 280 m$\mu$ to 700 m$\mu$.

4. The process for preparing polymers which comprises irradiating, with light of wavelengths in the range of 280 m$\mu$ to 700 m$\mu$ of such intensity and for a time sufficient to produce a substantial amount of polymerization, a composition comprising acrylonitrile, and as a photopolymerization catalyst therefor, from five to 20 percent acetaldehyde based on the weight of monomer.

5. The process for preparing polymers which comprises irradiating, with light in wavelengths in the range of 280 m$\mu$ to 700 m$\mu$ of such intensity and for a time sufficient to produce a substantial amount of polymerization, a monomeric composition at least 80 percent by weight of which is acrylonitrile and up to 20 percent of which is another nonbasic polymerizable monomer in the presence of a photopolymerization accelerator therefor consisting of from 5 to 20 percent of acetaldehyde based on the total weight of the monomers.

6. The process for preparing polymers which comprises irradiating, with light in wavelengths in the range of 280 m$\mu$ to 700 m$\mu$ of such intensity and for sufficient time to produce a substantial amount of polymerization, a monomeric composition at least 80 percent of which is acrylonitrile and up to 20 percent of which is vinyl acetate in the presence of a photopolymerization accelerator therefor consisting of from 5 to 20 percent of acetaldehyde based on total weight of the monomers.

7. In the preparation of acrylonitrile polymers by polymerization of acrylonitrile in the presence of light with wavelengths in the range of 280 m$\mu$ to 700 m$\mu$ of such intensity and for sufficient time to produce a substantial amount of polymerization, the improvement which comprises carrying out said photopolymerization in the presence of from five to 20 percent of acetaldehyde dissolved in the acrylonitrile.

References Cited in the file of this patent

UNITED STATES PATENTS

| | | |
|---|---|---|
| 2,104,760 | Renfrew | Jan. 11, 1938 |
| 2,548,685 | Sachs et al. | Apr. 10, 1951 |